(12) United States Patent
Paulsen et al.

(10) Patent No.: US 11,823,131 B2
(45) Date of Patent: *Nov. 21, 2023

(54) METHOD AND DEVICE FOR DETERMINING AN AREA CUT WITH A CUTTING ROLL BY AT LEAST ONE CONSTRUCTION MACHINE OR MINING MACHINE

(71) Applicant: Wirtgen GmbH, Windhagen (DE)

(72) Inventors: Sven Paulsen, Brohl-Lützing (DE); Stefan Wagner, Bad Honnef (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 151 days.

This patent is subject to a terminal disclaimer.

(21) Appl. No.: 17/459,097

(22) Filed: Aug. 27, 2021

(65) Prior Publication Data

US 2022/0051193 A1 Feb. 17, 2022

Related U.S. Application Data

(63) Continuation of application No. 16/504,898, filed on Jul. 8, 2019, now Pat. No. 11,113,668, which is a (Continued)

(30) Foreign Application Priority Data

Jun. 10, 2011 (DE) .......................... 102011106139.1

(51) Int. Cl.
*G06Q 10/10* (2023.01)
*E01C 19/00* (2006.01)
(Continued)

(52) U.S. Cl.
CPC ......... *G06Q 10/103* (2013.01); *E01C 19/004* (2013.01); *E01C 23/088* (2013.01);
(Continued)

(58) Field of Classification Search
CPC ..... E01C 23/088; E01C 19/004; G07C 5/085; G06Q 10/103; G06Q 10/1093;
(Continued)

(56) References Cited

U.S. PATENT DOCUMENTS

| 4,943,119 A | 7/1990 | Zarniko et al. |
| 5,309,407 A | 5/1994 | Sehr et al. |

(Continued)

FOREIGN PATENT DOCUMENTS

| DE | 9204614 U1 | 8/1992 |
| DE | 19756676 C1 | 6/1999 |

(Continued)

OTHER PUBLICATIONS

Office Action for corresponding German patent application No. 10 2011 122 977.2, dated May 8, 2023, 5 pages (not prior art).

*Primary Examiner* — An H Do
(74) *Attorney, Agent, or Firm* — Gary L. Montle; Lucian Wayne Beavers; Patterson Intellectual Property Law, PC

(57) ABSTRACT

In a method for determining an area milled by at least one construction machine or at least one mining machine by means of a milling drum (2) by means of working a predetermined area in several milling trajectories by at least one machine (1), determining the length of the milling trajectories along which a milling operation has taken place by evaluating the continuous machine positions, adding up the previously milled partial areas taking into account the length of the milling trajectory and the installed width of the milling drum (2), wherein the partial area currently milled along the milling trajectory is checked, either continuously or subsequently, for overlapping or multiple overlapping with any previously milled partial areas, and any partial areas which overlap are deducted, as overlapping areas, from the added-up previously milled partial areas, the total (Continued)

added-up partial areas milled minus the total overlapping areas established give the milled area.

20 Claims, 2 Drawing Sheets

Related U.S. Application Data continuation of application No. 15/437,657, filed on Feb. 21, 2017, now Pat. No. 10,354,228, which is a continuation of application No. 14/124,078, filed as application No. PCT/EP2012/060505 on Jun. 4, 2012, now Pat. No. 9,581,441.

(51) Int. Cl.

| | | |
|---|---|---|
| *E01C 23/088* | (2006.01) | |
| *E21C 35/00* | (2006.01) | |
| *G01B 21/28* | (2006.01) | |
| *G06Q 10/1091* | (2023.01) | |
| *G06Q 10/1093* | (2023.01) | |
| *G06Q 30/04* | (2012.01) | |
| *G06Q 50/08* | (2012.01) | |
| *G07C 5/08* | (2006.01) | |

(52) U.S. Cl.
CPC ............. *E21C 35/00* (2013.01); *G01B 21/28* (2013.01); *G06Q 10/1091* (2013.01); *G06Q 10/1093* (2013.01); *G06Q 10/1097* (2013.01); *G06Q 30/04* (2013.01); *G06Q 50/08* (2013.01); *G07C 5/085* (2013.01); *B60R 2300/302* (2013.01)

(58) Field of Classification Search
CPC ............. G06Q 30/04; G06Q 10/1091; G06Q 10/1097; G06Q 50/08; E21C 35/00; G01B 21/28; B60R 2300/302
See application file for complete search history.

(56) References Cited

U.S. PATENT DOCUMENTS

| | | | |
|---|---|---|---|
| 6,047,227 A | | 4/2000 | Henderson et al. |
| 6,212,862 B1 | | 4/2001 | Staub |
| 6,371,566 B1 | | 4/2002 | Haehn |
| 7,172,363 B2 | | 2/2007 | Olson et al. |
| 7,510,347 B2 | | 3/2009 | Lemke |
| 7,689,351 B2 | | 3/2010 | McCain |
| 8,047,741 B2 | | 11/2011 | Schonebeck et al. |
| 8,128,177 B2 | | 3/2012 | Menzenbach et al. |
| 8,246,270 B2 | | 8/2012 | Berning et al. |
| 8,292,371 B2 | | 10/2012 | Menzenbach et al. |
| 8,386,196 B2 | | 2/2013 | Wagner et al. |
| 8,424,972 B2 | | 4/2013 | Berning et al. |
| 8,456,290 B2 | | 6/2013 | Kido |
| 8,632,132 B2 | | 1/2014 | Menzenbach et al. |
| 8,672,581 B2 | | 3/2014 | Berning et al. |
| 8,807,867 B2 | | 8/2014 | Berning et al. |
| 9,121,146 B2 | | 9/2015 | Paulsen et al. |
| 9,126,776 B2 | | 9/2015 | Von Schonebeck et al. |
| 11,047,096 B2 | * | 6/2021 | Winkels ................ E01C 23/088 |
| 2008/0152428 A1 | | 6/2008 | Berning et al. |
| 2008/0153402 A1 | | 6/2008 | Arcona et al. |
| 2013/0197820 A1 | | 8/2013 | Wagner et al. |

FOREIGN PATENT DOCUMENTS

| | | |
|---|---|---|
| DE | 102004003358 A1 | 8/2005 |
| DE | 102007044090 A1 | 4/2009 |
| DE | 102008008260 A1 | 8/2009 |
| DE | 102008023743 A1 | 11/2009 |
| DE | 102008045470 A1 | 3/2010 |
| EP | 2119832 A1 | 11/2009 |
| JP | 01154904 A | 6/1989 |
| JP | 01271504 A | 10/1989 |
| JP | 09125700 A | 5/1997 |
| JP | 09151413 A | 6/1997 |
| JP | 09151446 A | 6/1997 |
| JP | 10-30919 A | 2/1998 |
| JP | 2000194983 A | 7/2000 |
| JP | 2000319815 A | 11/2000 |
| JP | 3172404 B2 | 6/2001 |
| JP | 2002350116 A | 12/2002 |
| JP | 2004036340 A | 2/2004 |
| JP | 2008163734 A | 7/2008 |
| JP | 2009545689 A | 12/2009 |
| JP | 2011163111 A | 8/2011 |
| JP | 2011226265 A | 11/2011 |
| WO | 9932726 A1 | 7/1999 |

\* cited by examiner

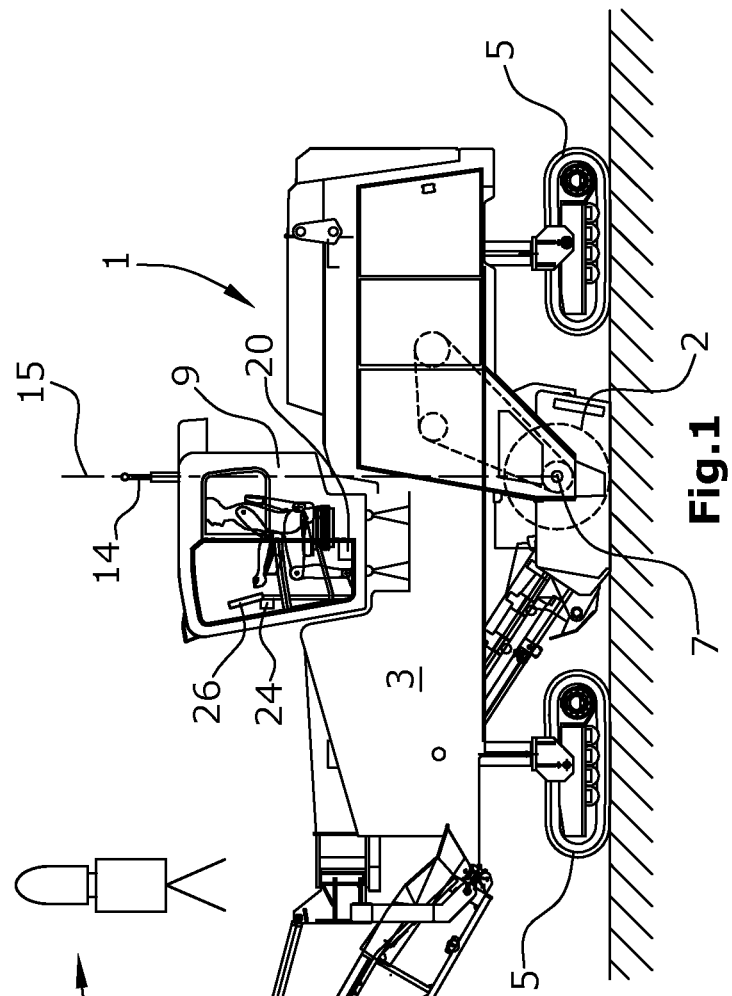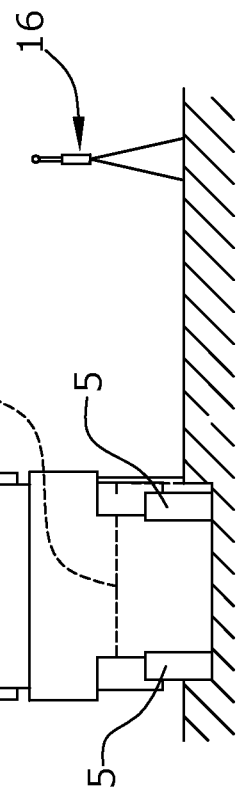

METHOD AND DEVICE FOR DETERMINING AN AREA CUT WITH A CUTTING ROLL BY AT LEAST ONE CONSTRUCTION MACHINE OR MINING MACHINE

BACKGROUND OF THE INVENTION

1. Field of the Invention

The invention relates to a method for determining an area milled by at least one construction machine or at least one mining machine by means of with a milling drum, as well as a construction machine or mining machine for working a predetermined area.

2. Description of the Prior Art

When working ground surfaces or traffic surfaces by means of milling machines, stabilizers or recyclers, and when mining deposits by means of mining machines (surface miners), the milled area and/or the milled volume is usually required as basis for the settlement of the services rendered for the purpose of documenting and settling the services rendered on the construction site. These data are determined or estimated, for example, from data previously known or determined from cartographic material or surveying documents, it being assumed here in a simplifying manner that the actually milled area or the actually milled volume precisely corresponds to the area to be milled or the volume to be milled that was previously stated in the contract.

It is also known to carry out, after completion of the milling operation, a more or less accurate determination of the milled area or the milled volume, respectively, by means of simple measuring instruments (for example, odometer and folding rule).

Lastly, it is also known to determine an approximated value of the currently milled volume and, by integration, establish a daily volume from the travelled distance, which can be read out from or is measured by a machine control system, and a milling depth, assuming that the milling drum width installed corresponds to the effectively milled milling width.

It has become apparent, however, that in practice the actually milled area or the actually milled volume deviates from the geometrical data stipulated in a service contract or from the data derived from surveying documents or maps with, as a general rule, the actually milled volume being the larger. This is therefore of disadvantage to the contracting company as the inaccurate settlement will be to its detriment. One reason for this may be, for example, the three-dimensionality of a course of, for example, a motorway section in a hilly area because the length of a milling trajectory is smaller in the map projection than in the three-dimensional course of the road. Another reason is additional work that was not known or not foreseeable prior to awarding the contract and is thus not reflected in the surveying documents or maps.

Measuring with simple measuring means (odometer, folding rule) is also merely a more or less accurate approximation to the actual service rendered as complex milling geometries are frequently also worked that are not accessible to calculation by way of simple means.

Such methods of settlement are not only inaccurate but also time-consuming.

SUMMARY OF THE INVENTION

It is therefore the object of the invention to create a method and a construction machine or mining machine which can be used to document the service rendered with at least one construction machine or mining machine in a timely, automatic, highly accurate and inexpensive manner.

The above mentioned object is achieved by the features of the claims.

In a method for determining an area milled by at least one construction machine or by at least one mining machine with a milling drum, the following steps are intended according to the invention:

- working a predetermined area in several milling trajectories by at least one machine,
- determining the length of the milling trajectories along which a milling operation has taken place by evaluating the continuous machine positions,
- adding up the previously milled partial areas as a product of the length of the milling trajectory and the installed width of the milling drum, wherein the partial area currently milled along the milling trajectory is checked either continuously or subsequently for overlapping or multiple overlapping with any previously milled partial areas, and partial areas which overlap are deducted, as overlapping areas, from the added-up previously milled partial areas, and
- the total added-up partial areas milled minus the total overlapping areas established give the milled area.

The solution according to the invention offers the advantage that, at the end of a working day or at the completion of a service contract, the service rendered is determined automatically and is retrievable immediately at the end of the operation.

In this process, idle milling and overlaps or even multiple overlaps of milling trajectories are taken into account automatically.

A particular advantage offered by this approach is that a separate recording of the current overlap by means of sensors or measuring technology is not required. Rather, the overlap is determined by evaluating precise positioning measurements from the milling trajectories.

Working of the predetermined area is effected in several milling trajectories by one or several machines.

The lengths of the milling trajectories along which a milling operation has taken place are determined by evaluating the continuous machine position.

In the process, it is established as to when a milling operation is taking place and when not. In this regard, there is the possibility for the operator to enter the information manually. Alternatively, it can also be established automatically as to when a milling operation is taking place, for example, by establishing whether the milling drum is rotating or not, or whether the transport conveyor is in operation or not, or what output is currently being generated by the combustion engine. Such a signal is retrievable, for example, from the machine control system. The most suitable signal, however, is one that records the adjusted or current milling depth. As a result, only the previously milled partial areas can therefore be recorded as a product of the length of the milling trajectory and the installed width of the milling drum. Distances travelled by the machine in which no milling operation is taking place are therefore not added up.

Upon completion of the milling operation, the total added-up partial areas milled minus the total overlapping areas established are retrievable from, for example, a memory as the milled area as the work result.

The machine position of each single machine is determined by means of at least one reference point on the machine. The reference point is preferably arranged above the milling drum, for example, on the roof of an operator's platform. A reference point particularly preferred is one that is orthogonal to the machine frame in a common vertical plane through the axis of the milling drum when the machine is standing on a horizontal plane.

Preferably, at least one GNSS receiver (Global Navigation Satellite System) is used to determine the machine position. Such a system for position determination and navigation uses signals from navigation satellites and/or pseudolites.

Alternatively, it is also possible to additionally use reference positioning data from a stationary GNSS receiver or a data reference service to increase accuracy.

A total station may also be used as an alternative to a position determination device based on a GNSS receiver. A total station is an electronic theodolite, integrated with an electronic distance measuring device, to measure the inclination and the distance of the instrument from the reference point.

In the event of interferences with reception of the at least one GNSS receiver attached to the machine, the missing or incorrect positioning data can be computed or corrected as substitute data based on the previous and further course of the milling trajectories or based on recorded advance speed and steering angle data from the machine's machine control system.

To this end, it may be intended that, in the event of interferences with reception of the at least one GNSS receiver attached to the machine, the computer computes substitute data for any missing or incorrect positioning data by interpolation from earlier and later positioning data relative to the time of the interference with reception, or computes substitute data from advance speed and steering angle data recorded by the respective machine control system.

The positioning data recorded prior to and after a data gap attributable to interferences with reception can thus be completed by interpolated substitute data so that a gapless course of the milling trajectories can be utilized.

The positioning data as well as the reference positioning data can be transmitted wirelessly to an external computer. This is of particular advantage if the data of several machines are to be evaluated in order to compute the milling work performed.

To determine the volume milled along the milling trajectories, the current milling depth in the centre of the milling drum (as seen in longitudinal direction) or the current milling depth cross-section can be recorded in accordance with the position of the machine, with the milled volume resulting from the total added-up partial volumes minus the total overlapping volumes established. In doing so, different milling depths can also be taken into account with regard to the individual milling trajectories.

This method provides in an advantageous manner for the current milling depth or a milling depth cross-section to be saved along with and for each current position of the machine along the milling trajectory.

In a construction machine or mining machine for working a predetermined area in several milling trajectories by at least one machine, with a milling drum each of a predetermined milling width, a position determination device and a machine control system, it is intended that the position determination device of each single machine generates positioning data of the at least one machine, one computer for all machines receives the positioning data of the respective machine and in connection with the milling width of the milling drum installed in each case computes, from the continuous positioning data, the length of the respective milling trajectory along which a milling operation has taken place and the area milled along said milling trajectory, adding it up as the previously milled partial area, the computer checks, either continuously or subsequently, the currently milled partial area of all machines for overlapping or multiple overlapping with previously added-up partial areas of all machines, the computer deducts any partial areas which overlap, as overlapping areas, from the added-up partial areas milled, wherein the total added-up previously milled partial areas minus the total overlapping areas computed give the milled area.

It may additionally be intended that the computer additionally receives at least one milling depth signal with respect to the current milling depth or current milling depth cross-section and attributes said milling depth signal to the current machine position of the respective machine, computes the milling trajectories in terms of their length by recording the continuous machine positions at which a milling operation is taking place, and computes and adds up the previously milled partial volumes, taking into account the current milling depth or the milling depth cross-section in accordance with the machine position, checks, either continuously or subsequently, the currently milled partial volumes for overlapping or multiple overlapping with the previously added-up partial volumes and deducts any overlapping volumes from the added-up partial volumes milled, wherein the computer computes the milled volume from the total partial volumes added up from the milling depth or the milling depth cross-section and the continuous machine positions of the at least one machine minus the total established overlapping volumes determined accordingly.

In the following, one embodiment of the invention is explained in greater detail with reference to the drawings.

BRIEF DESCRIPTION OF THE DRAWINGS

The following is shown:

FIG. 1 a construction machine in the design of a road milling machine,

FIG. 2 a view of the road milling machine from the rear, and

DETAILED DESCRIPTION

Figure 3:
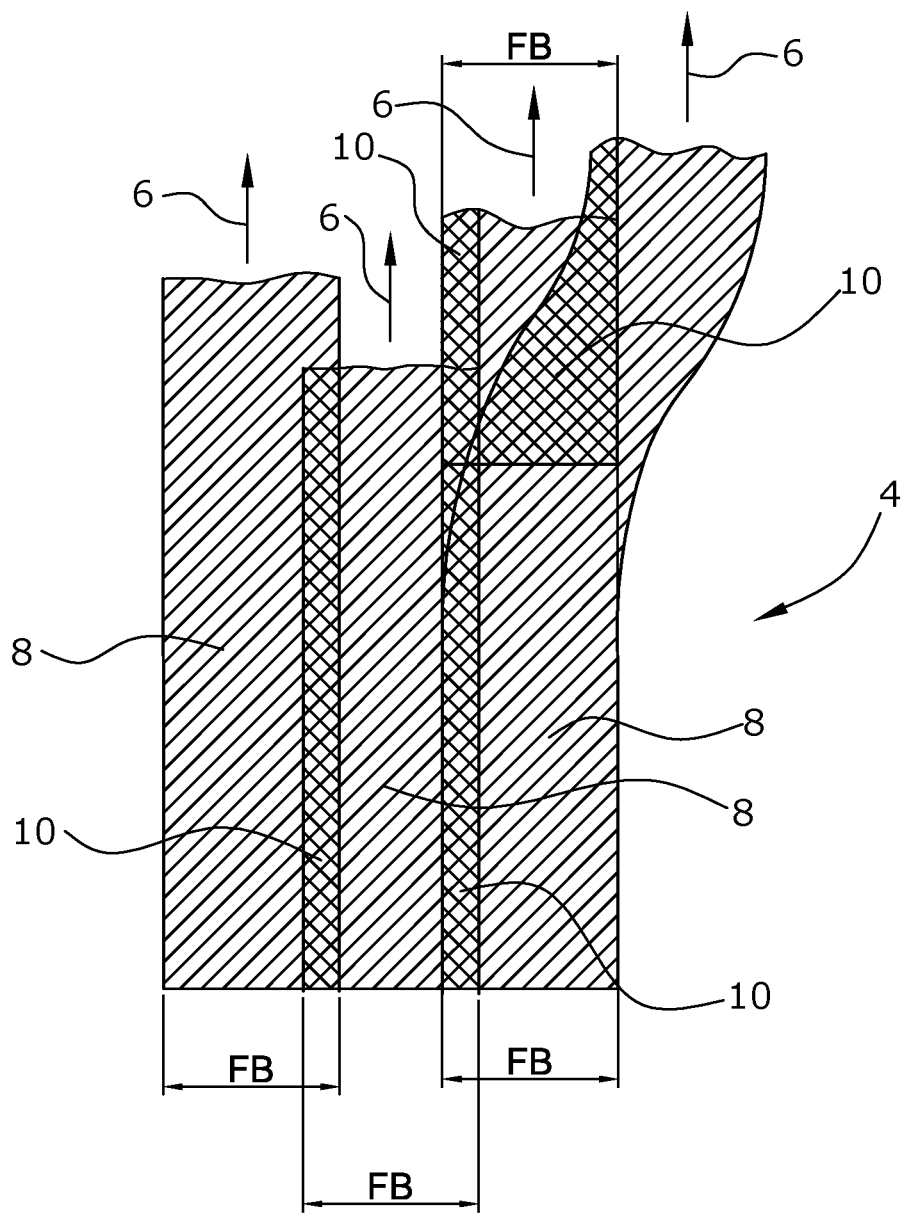
FIG. 3 different milling trajectories of a surface to be worked.

The machine 1 shown in FIG. 1 is a construction machine, namely a road milling machine, and is depicted to represent all types of machines with a milling drum 2 that work a ground surface or traffic surface.

These include mining machines which are used to mine deposits, for example, in opencast mining and which are also called surface miners.

The machine 1 shown in FIG. 1 comprises a machine frame 3 in which the milling drum 2 is supported in a rigid or height-adjustable manner. The machine 1 is carried by a chassis which, in FIG. 1, is formed by crawler tracks 5. The milled material can be loaded onto a transport vehicle by means of a transport conveyor 11. On its top side, the machine frame 3 carries an operator's platform 9 which may consist of a cabin. An operator sits or stands in the operator's platform 9 who controls the functions of the machine 1 by means of a machine control system 26. Said machine functions are, for example, advance speed, steering, milling depth of the milling drum 2 etc. The machine 1 is provided with a position determination device 24 that is capable of forwarding its information to a computer 20 for further processing, wherein said computer 20 may also be integrated in the machine control system 26. Moreover, it may be intended for the position determination device 24 to be integrated in the computer 20.

Above the operator's platform 9, for example, on the roof of the operator's cabin, a GNSS receiver 14 may be arranged as part of the position determination device 24, said GNSS receiver 14 being preferably arranged in such a manner that it is in a common vertical plane 15 with the milling drum axis 7 of the milling drum 2 when the machine 1 is aligned horizontally.

The GNSS receiver 14 forms a reference point on the machine 1 whereby the current machine position can be determined.

Other reference points on the machine 1 may also be selected in which case the positioning data for computing the machine position must then be corrected accordingly. The machine position relevant for computing is the centre of the milling drum 2 in relation to its longitudinal extension. A single GNSS receiver 14 is therefore preferably located vertically above said central position of the milling drum 2 when the machine 1 is standing on a horizontal plane or the machine frame 3 is aligned horizontally. Even if the GNSS receiver is attached in precisely this position, the positioning data require correction. A correction could only be omitted if the machine worked on a horizontal plane all the time and, in doing so, remained in parallel alignment to the same in both longitudinal and transverse direction. As soon as a transverse or longitudinal inclination of the machine 1 relative to the horizontal plane is present, a correction must be made, which is nearly always the case. Appropriate slope sensors are present to serve this purpose.

It is also possible to use two GNSS receivers 14 as can, in principle, be inferred from FIG. 2. An essential requirement is for these two GNSS receivers 14 to exhibit a mutual distance. Even when using two GNSS receivers 14, as depicted in FIG. 2, these are preferably located in the plane 15 and at an identical height. It is understood, however, that the two GNSS receivers 14 may also be arranged at other points of the machine 1.

The GNSS receivers 14 should ideally be arranged on the roof of the operator's platform 9 so that, on the one hand, the interference from reflected signals is as small as possible and, on the other hand, when driving through a milling area bounded by trees, at least one GNSS receiver 14 does not lose contact to all satellites on account of the trees.

Additionally, reference positioning data from a stationary GNSS receiver 16 or a data reference service can be used to increase the accuracy of determining the machine position. As a further alternative for determining the machine position, a total station 28 may be used which is capable of tracking a reference point on the machine three-dimensionally, with it also being possible for several total stations 28 to be used. If one total station is used, then the at least one GNSS receiver must be replaced by at least one measuring prism.

The current position of the machine 1 can be recorded by means of the position determination device 24, and thus the length of the distance travelled along the milling trajectories 6 can be computed and stored by means of an internal or external computer 20.

At the beginning of a milling contract to be documented, a memory of the computer 20, in which the previously milled area 4 can be stored, is set to zero. Now, if an area predetermined in a contract is milled by at least one machine 1, the length of the milling trajectories 6 is determined first by means of the data established with respect to the machine position and the continuous change of the same, and the previously milled partial area 4 is then computed and added up taking into account the installed milling width of the milling drum 2. The previously milled partial area 4 is stored in the memory of the computer 20, with the area 4 milled along the milling trajectory 6 being checked, either continuously or subsequently, for overlapping or multiple overlapping with previously milled partial areas 8. If an overlap is established in the computer, any partial areas which overlap are deducted, as overlapping areas 10, from the added-up, previously milled partial areas 8 in the memory. The milling trajectories 6 can be stored, for example, by means of two-dimensional or three-dimensional coordinates. The machine control system or the operator, respectively, informs the computer as to whether a milling operation is currently taking place or not so that any idle travels of the machine 1 are not recorded. If the milling depth is recorded for the purpose of computing the milled volumes, such message to the computer may be omitted because the computer is capable of determining independently, based on the milling depth adjusted, as to whether a milling operation is currently taking place. Instead of the adjusted milling depth, the effective milling depth may also be used if the same is available in the machine control system. Alternatively, other signals from the machine control system could be used, such as a switch-on signal for the milling drum or a switch-on signal for the transport conveyor for removal of the milled material, or signals from the engine control system, such as the torque of the engine driving the milling drum.

Upon completion and finalization of the contract, the actually milled area 4 is retrievable from the memory so that the value stored in the same and determined fully automatically can be used as a basis for settlement with a client.

FIG. 3 shows several milling trajectories 6 arranged adjacent to one another on an area 4 to be milled.

FIG. 3 additionally depicts the previously milled partial areas 8 and the overlapping areas 10 resulting therefrom which need to be deducted from the areas added up along the milling trajectory 6. Four milling trajectories 6 of different lengths with, in part, multiple overlaps can be inferred from the example of an area 4 to be milled shown in FIG. 3.

In certain cases, such as those where the milling contract includes different milling depths, it may be necessary to not take the milled area but the milled volume as the basis for settlement of the service contract.

In this case, it is intended, in addition to determining the length of the milling trajectories 6 and the milled areas, to additionally record the current milling depth so that the computer 20 can determine the milled volume. The current milling depth can be determined in relation to the centre of the milling drum 2 based on its longitudinal direction. Alternatively, the current milling depth cross-section transversely to the width of the machine 1 can be taken from the data of the machine control system and recorded in accordance with the machine position. The milled volume then results from the total added-up partial volumes minus the total overlapping volumes established.

The current milling depth can also be measured, should the need arise, if it is not to be read out from the machine control system 26.

In case of several machines 1, at least one reference point is intended for each machine.

In case of several machines, one of the machines 1 may be determined as the leading machine.

In particular where several machines 1 are used, the computer 20 may also be arranged externally in a stationary fashion or may be arranged in the leading machine 1, in which case the data exchange of positioning data, reference positioning data or substitute data from the machine control system 26 of all machines 1 is effected wirelessly, for example, via satellite or cellular communication network.

In the event of interferences with reception of the at least one GNSS receiver 14 attached to a machine 1, the computer 20 can compute substitute data for any missing or obviously incorrect positioning data and can complete the missing positioning data or the incorrect positioning data, respectively. This can be computed by interpolation from earlier and later positioning data relative to the time of the interference with reception. Alternatively, substitute data can be computed from advance speed and steering angle data recorded in the respective machine control system 16 of a machine 1.

The invention claimed is:

1. A method of determining a milled area of a construction machine including a milling drum, the method comprising:
   in at least one milling trajectory defined by travel of the construction machine across a ground surface:
   (a) generating, via at least one sensor, data corresponding to a distance traveled by the construction machine, wherein the distance traveled is further corrected based on a detected transverse and/or longitudinal inclination of the construction machine relative to a horizontal plane;
   (b) generating a signal indicating whether a milling operation is currently taking place; and
   (c) automatically determining the area of material milled at least partially as a function of an effectively milled milling width with respect to the distance traveled by the construction machine while the milling operation is currently taking place.

2. The method of claim 1, wherein:
   the ground surface is milled in a plurality of milling trajectories; and
   the effectively milled milling width in step (c) accounts for whether a portion of a current milling depth cross-section has been milled in a previous milling trajectory.

3. The method of claim 2, wherein:
   the effectively milled milling width in step (c) further accounts for subtracting any overlapping milled area of the previous milling trajectory.

4. The method of claim 1, wherein:
   in step (a) the at least one sensor includes at least one GNSS receiver configured to generate positioning data corresponding to a current machine position.

5. The method of claim 4, wherein:
   step (a) further includes using reference positioning data from a stationary GNSS receiver or a data reference service.

6. The method of claim 1, wherein:
   in step (a) the at least one sensor includes a measuring prism associated with a total station.

7. The method of claim 1, further comprising:
   generating a milling depth signal corresponding to a current milling depth of the milling drum, wherein the signal in step (b) indicating whether a milling operation is currently taking place corresponds to the milling depth signal.

8. The method of claim 1, wherein the signal in step (b) indicating whether a milling operation is currently taking place is provided as a switch-on signal for the milling drum and/or for a transport conveyor for removal of milled material.

9. The method of claim 1, wherein the signal in step (b) indicating whether a milling operation is currently taking place is representative of a torque of an engine driving the milling drum.

10. A construction machine, comprising:
    a milling drum;
    at least a first sensor configured to generate data corresponding to a distance traveled by the construction machine along a milling trajectory defined by travel of the construction machine across a ground surface;
    at least a second sensor configured to generate data corresponding to a transverse and/or longitudinal inclination of the construction machine; and
    a machine control system operatively associated with the at least first sensor and the at least second sensor, the machine control system being configured to:
    receive a signal indicating whether a milling operation is currently taking place;
    correct the data corresponding to the distance traveled based on the data corresponding to a transverse and/or longitudinal inclination; and
    automatically determine the area of material milled at least partially as a function of an effectively milled milling width with respect to the distance traveled by the construction machine while the milling operation is currently taking place.

11. The construction machine of claim 10, wherein:
    the at least first sensor includes at least one GNSS receiver configured to generate positioning data corresponding to a current machine position.

12. The construction machine of claim 10, wherein:
    the at least first sensor includes a measuring prism associated with a total station.

13. The construction machine of claim 10, wherein:
    the at least first sensor is configured such that the positioning data is based on at least one reference point on the construction machine.

14. The construction machine of claim 10, wherein:
    the machine control system is configured such that the determination of the area of material milled is performed continuously during the travel of the construction machine along the milling trajectory.

15. The construction machine of claim 10, wherein:
    the machine control system is configured such that the determination of the area of material milled includes accounting for whether a portion of a current milling depth cross-section has been milled in a previous milling trajectory.

16. The construction machine of claim 15, wherein:
the machine control system is configured such that the accounting for whether a portion of a current milling depth cross-section has been milled in a previous milling trajectory includes subtracting any overlapping milled area of the previous milling trajectory.

17. The construction machine of claim 10, wherein:
the machine control system is configured such that the determination of the area of material milled is performed subsequently to the travel of the construction machine along a plurality of milling trajectories.

18. The construction machine of claim 10, wherein:
the signal indicating whether a milling operation is currently taking place corresponds to a signal generated to represent a current milling depth of the milling drum.

19. The construction machine of claim 10, wherein the signal indicating whether a milling operation is currently taking place is provided as a switch-on signal for the milling drum and/or for a transport conveyor for removal of milled material.

20. The construction machine of claim 10, the signal indicating whether a milling operation is currently taking place is representative of a torque of an engine driving the milling drum.

* * * * *